US011201336B2

(12) United States Patent
Kataoka et al.

(10) Patent No.: US 11,201,336 B2
(45) Date of Patent: Dec. 14, 2021

(54) PRODUCTION METHOD AND PRODUCTION APPARATUS FOR JOINT SEPARATOR

(71) Applicant: HONDA MOTOR CO., LTD., Tokyo (JP)

(72) Inventors: Yohei Kataoka, Wako (JP); Yasuhide Fukushima, Wako (JP); Toshiki Kawamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 177 days.

(21) Appl. No.: 16/559,812

(22) Filed: Sep. 4, 2019

(65) Prior Publication Data
US 2020/0083544 A1   Mar. 12, 2020

(30) Foreign Application Priority Data

Sep. 6, 2018 (JP) .............................. JP2018-166588

(51) Int. Cl.
*H01M 8/0206* (2016.01)
*H01M 8/0221* (2016.01)
*H01M 8/0213* (2016.01)
*H01M 8/0267* (2016.01)

(52) U.S. Cl.
CPC ....... *H01M 8/0206* (2013.01); *H01M 8/0213* (2013.01); *H01M 8/0221* (2013.01); *H01M 8/0267* (2013.01)

(58) Field of Classification Search
None
See application file for complete search history.

(56) References Cited

U.S. PATENT DOCUMENTS 8,882,859 B2 * 11/2014 Bae .................... H01M 8/0206
29/623.2
2006/0054664 A1 * 3/2006 Strobel .............. H01M 8/0228
228/179.1

FOREIGN PATENT DOCUMENTS

CN          101202336          6/2008

OTHER PUBLICATIONS

Chinese Office Action and Search Report for Chinese Patent Application No. 201910831923.4 dated Mar. 11, 2021.

* cited by examiner

*Primary Examiner* — Daniel S Gatewood
(74) *Attorney, Agent, or Firm* — Amin, Turocy & Watson, LLP

(57) ABSTRACT

In a production method and a production apparatus for producing a joint separator, in the state where first and second separators are stacked together, a step of fixing the first and second separators by holding the first and second separators between a base and a holder is performed. Thereafter, a step of welding the first and second separators by radiating a laser light from laser light emitting units, through gaps provided in the holder is performed. After the welding step, an additional pressing step of moving pressing members ahead through the gaps to press heat affected zones welded by the laser light, by the pressing members is performed.

6 Claims, 8 Drawing Sheets

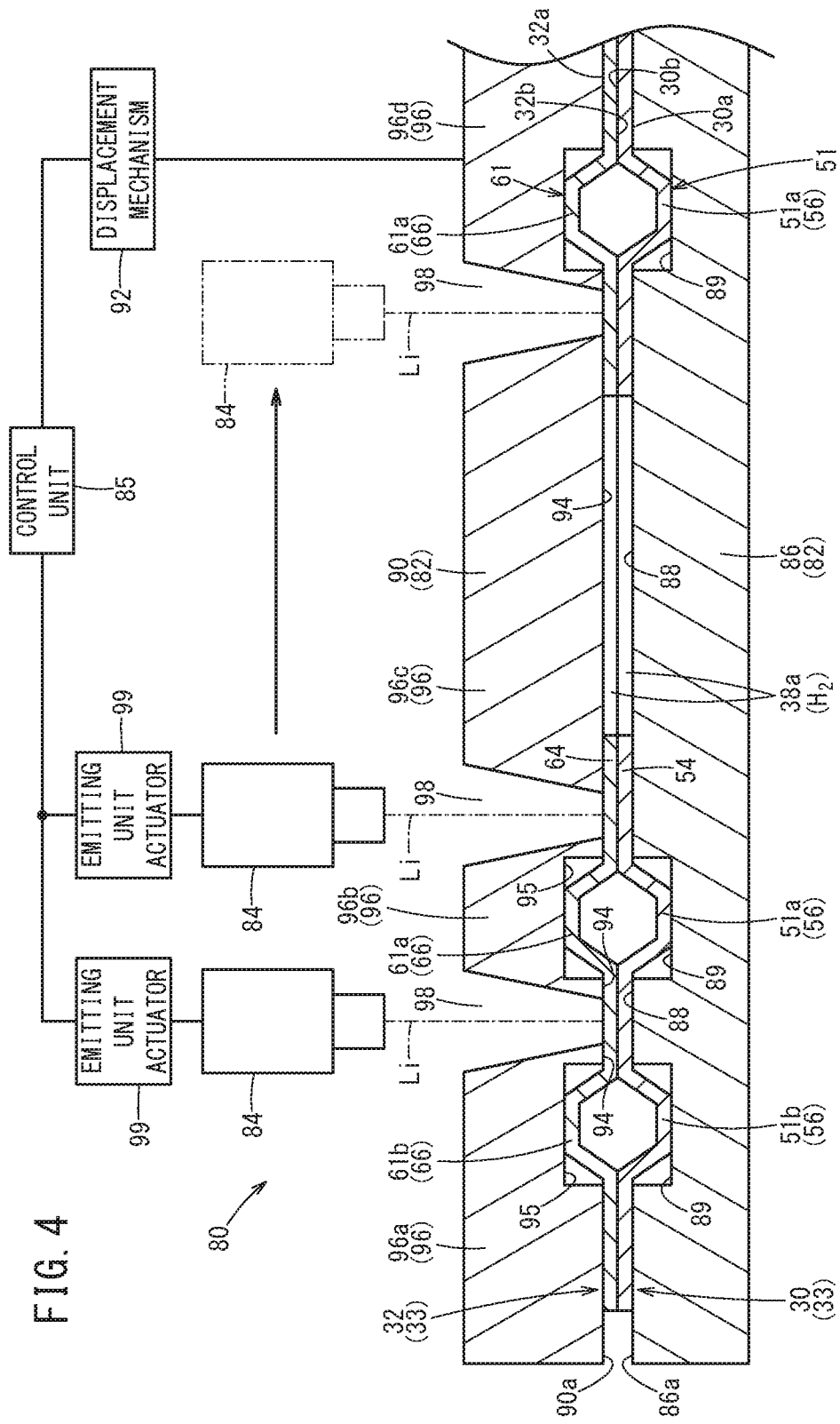

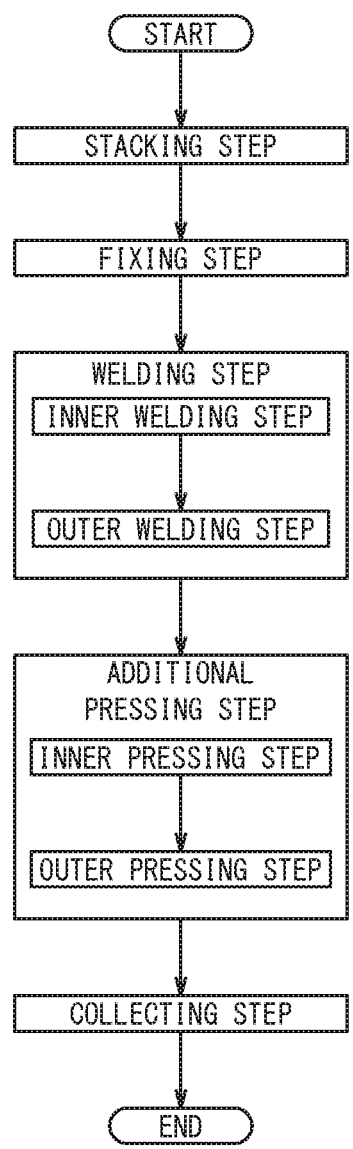

PRODUCTION METHOD AND PRODUCTION APPARATUS FOR JOINT SEPARATOR

CROSS-REFERENCE TO RELATED APPLICATION

This application is based upon and claims the benefit of priority from Japanese Patent Application No. 2018-166588 filed on Sep. 6, 2018, the contents of which are incorporated herein by reference.

BACKGROUND OF THE INVENTION

Field of the Invention

The present invention relates to a production method and a production apparatus for producing a joint separator formed by welding a plurality of metal plates together.

Description of the Related Art

The fuel cell includes a membrane electrode assembly (MEA) formed by stacking an anode, a solid polymer electrolyte membrane, and a cathode, and a pair of separators as bipolar plates (metal plates) sandwiching the MEA. The fuel cell stack formed by stacking a plurality of fuel cells may adopt structure where a separator of one of fuel cells and a separator of the other of the fuel cells contact each other. Therefore, in the production step of the fuel cell stack, a joint separator is formed by joining two (a plurality of) separators beforehand, and a plurality of the joint separators and MEAs are stacked together alternately.

For example, Specification of U.S. Patent Application Publication No. 2006/0054664 discloses a production method of producing a joint separator by joining two separators together. In production of the joint separator, for example, predetermined positions of the separators which contact each other are welded together by laser welding to form a welding zone.

SUMMARY OF THE INVENTION

However, in production of the joint separator, heat distortion occurs due to the heat generated as a result of laser welding, and warpage of the separator may occur. If warpage occurs in the separator, for example, it becomes difficult to accurately stack the fuel cells together accurately, and leakage of reactant gases and/or a coolant flowing inside the fuel cells occurs, and the contact surface pressure between the MEA and the separator becomes non-uniform.

The present invention has been made to solve the above problems, and an object of the present invention is to provide a production method and a production apparatus for a joint separator in which it is possible to produce the joint separator suitably while suppressing warpage produced as a result of heat distortion.

In order to achieve the above object, according to a first aspect of the present invention, a method of producing a joint separator formed by joining a plurality of metal plates together by laser welding is provided. The method includes the steps of fixing at least two of the metal plates placed on a base in a state where the two metal plates are stacked together, by holding the two metal plates between the base and a holder, welding the two metal plates together after the fixing step, by radiating a laser light to the metal plates from a laser light emitting unit, through a gap provided in the holder, and performing an additional pressing step after the welding step, by moving a pressing member ahead through the gap, in a state where two metal plates are held between the base and the holder, to press an area welded by the laser light, by the pressing member.

Further, in order to achieve the above object, according to the second aspect of the present invention, a production apparatus for forming a joint separator by joining a plurality of metal plates together by laser welding is provided. The apparatus includes a base where at least two of the metal plates are placed in a state where the two metal plates a stacked together, a holder configured to hold the two metal plates between the base and the holder, a laser light emitting unit configured to radiate a laser light to the metal plates, through a gap provided in the holder in a state where the two metal plates are held between the base and the holder, to weld the two metal plates together, and a pressing member configured to move ahead through the gap, in a state where two metal plates are held between the base and the holder, to press an area welded by the laser light.

In the production method and the production apparatus for the joint separator, after laser welding using the laser light, in the state where the two metal plates are held between the base and the holder, the welded area is pressed by the pressing member. In this manner, it is possible to achieve distribution of the residual stress remaining in the welded area, and correct (straighten) warpage of the metal plate themselves efficiently. Accordingly, in the joint separator, it becomes possible to stack the power generation cells together accurately, and suppress leakage of the reactant gases and the coolant. Further, it is possible to improve the uniformity of the contact surface pressure between the membrane electrode assembly (MEA) and the separators.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a cross sectional view showing the joint separator taken along a line IV-IV in FIG. 3 and a production apparatus in combination;

FIG. 8 is a flow chart showing the steps of producing the joint separator.

DESCRIPTION OF THE PREFERRED EMBODIMENTS

Figure 1:
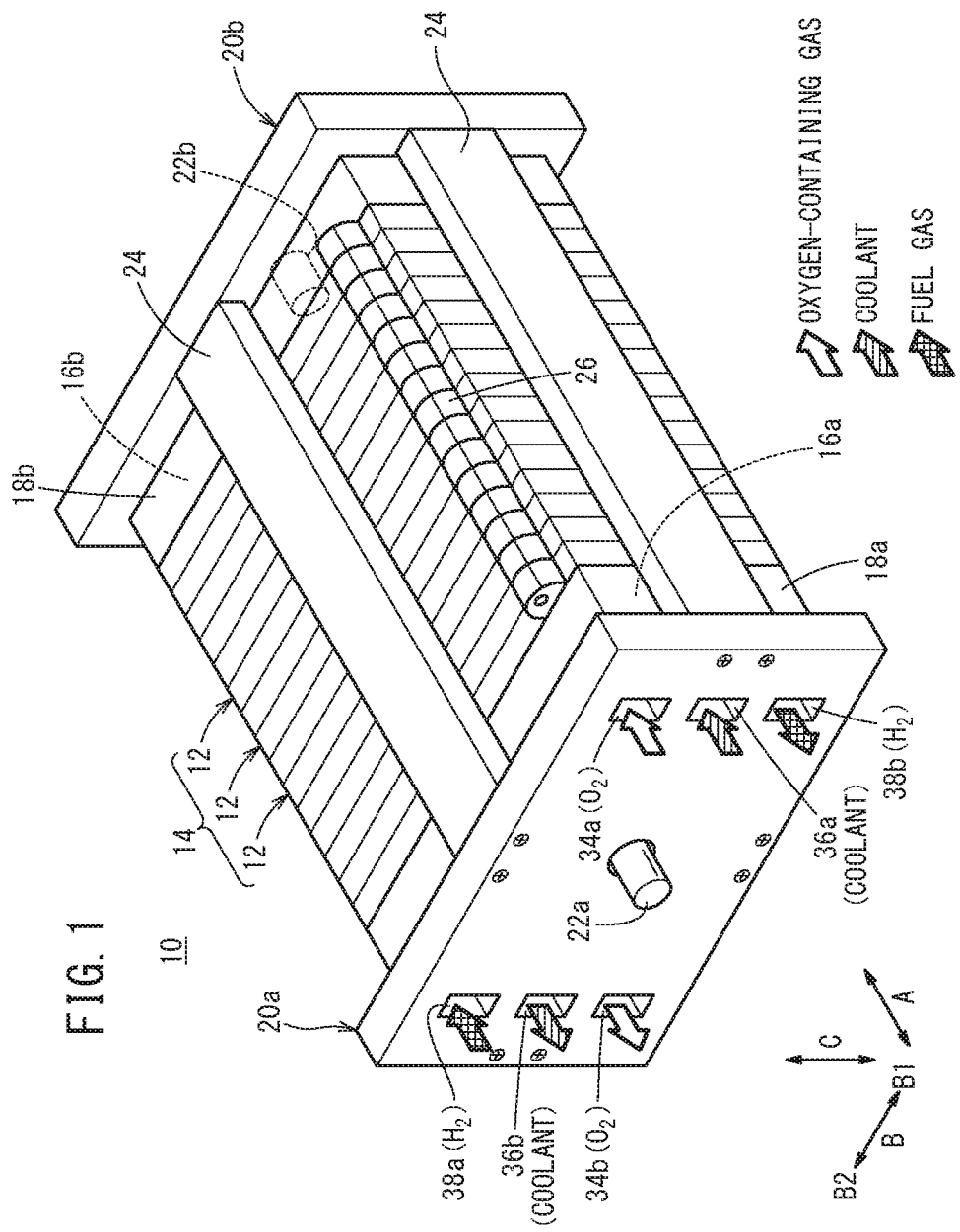
FIG. 1 is a perspective view showing a fuel cell stack to which a joint separator according to an embodiment of the present invention is applied.

Hereinafter, a preferred embodiment of the present invention will be described with reference to the accompanying drawing As shown in FIG. 1, a fuel cell stack 10 according to an embodiment of the present invention includes a stack body 14 formed by stacking a plurality of fuel cells 12 (unit cells) in a horizontal direction (indicated by an arrow A) or in a gravity direction (indicated by an arrow C). For example, the fuel cell stack 10 is mounted in a fuel cell vehicle (fuel cell automobile) (not shown).

At one end of the stack body 14 in the stacking direction (indicated by the arrow A), a terminal plate 16a is provided. An insulator 18a is provided outside the terminal plate 16a, and an end plate 20a is provided outside the insulator 18a. At the other end of the stack body 14 in the stacking direction, a terminal plate 16b is provided. An insulator 18b is provided outside the terminal plate 16b, and an end plate 20b is provided outside the insulator 18b. Coupling bars 24 are provided between the sides of the end plates 20a, 20b for applying a tightening load to the stack body 14.

Terminals 22a, 22b are provided in the centers of the terminal plates 16a, 16b. The terminals 22a, 22b extend outward in the stacking direction. It should be noted that the stack body 14 of the fuel cell stack 10 may be placed in a casing including the end plates 20a, 20b.

Figure 2:
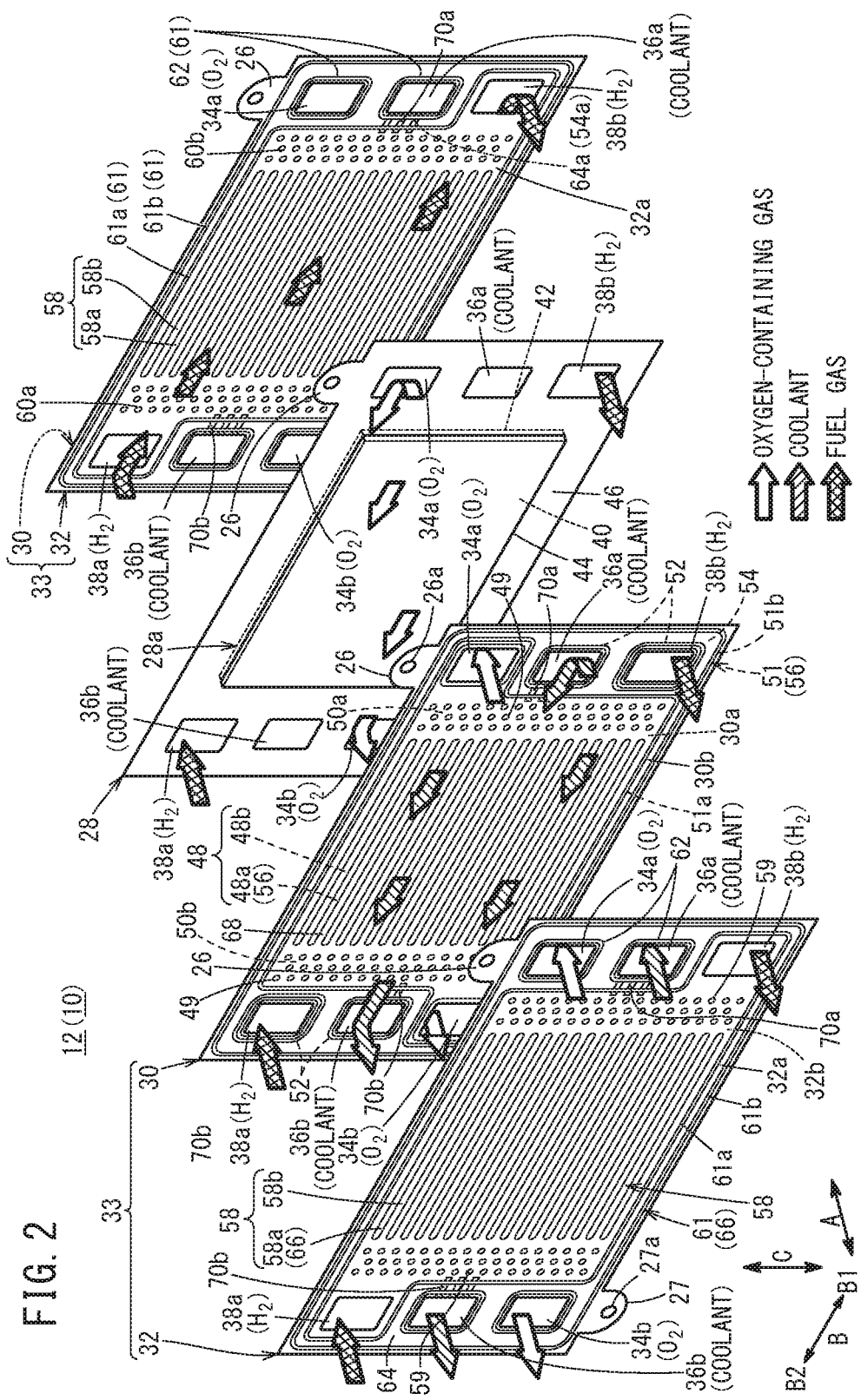
FIG. 2 is an exploded perspective view showing a fuel cell of the fuel cell stack.

As shown in FIG. 2, the fuel cell 12 includes a resin frame equipped MEA 28, a first metal separator 30 provided on one surface of the resin frame equipped MEA 28 (hereinafter simply referred to as the first separator 30), and a second metal separator 32 provided on the other surface of the resin frame equipped MEA 28 (hereinafter simply referred to as the second separator 32).

Further, at an upper position of one end of each of the fuel cells 12 in a horizontal direction (longitudinal direction) indicated by an arrow B1, an extension 26 is formed for positioning the resin frame equipped MEA 28, the first separator 30, and the second separator 32 with respect to one another, at the time of stacking the resin frame equipped MEA 28, the first separator 30, and the second separator 32 together. Further, at a lower position of the other end of each of the fuel cells 12 in the longitudinal direction indicated by an arrow B2, an extension 27 is formed for positioning the resin frame equipped MEA 28, the first separator 30, and the second separator 32 with respect to one another, at the time of stacking the resin frame equipped MEA 28, the first separator 30, and the second separator 32 together. Through holes 26a, 27a are formed in the extension 26, 27, respectively. The through holes 26a, 27a penetrate through the extensions 26, 27. The through holes 26a, 27a are used for positioning by inserting common pins (not shown) in the through holes 26a, 27a.

At one end of the fuel cells 12 in the longitudinal direction, an oxygen-containing gas supply passage 34a, a coolant supply passage 36a, and a fuel gas discharge passage 38b are provided. The oxygen-containing gas supply passage 34a, the coolant supply passage 36a, and the fuel gas discharge passage 38b extend through the fuel cells 12 in the stacking direction indicated by the arrow A. The oxygen-containing gas supply passage 34a, the coolant supply passage 36a, and the fuel gas discharge passage 38b area arranged in a vertical direction indicated by an arrow C. An oxygen-containing gas as one of the reactant gases is supplied through the oxygen-containing gas supply passage 34a. A coolant such as water is supplied through the coolant supply passage 36a. A fuel gas such as a hydrogen-containing gas as the other of reactant gases is discharged through the fuel gas discharge passage 38b.

At the other end of the fuel cells 12 in the longitudinal direction, a fuel gas supply passage 38a, a coolant discharge passage 36b, and an oxygen-containing gas discharge passage 34b are provided. The fuel gas supply passage 38a, the coolant discharge passage 36b, and the oxygen-containing gas discharge passage 34b extend through the fuel cells 12 in the stacking direction. The fuel gas supply passage 38a, the coolant discharge passage 36b, and the oxygen-containing gas discharge passage 34b are arranged in the vertical direction. The fuel gas is supplied through the fuel gas supply passage 38a. The coolant is discharged through the coolant discharge passage 36b. The oxygen-containing gas is discharged through the oxygen-containing gas discharge passage 34b. The layout and the shapes of the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b is not limited to the illustrated embodiment, and may be determined as necessary depending on the required specification.

The resin frame equipped MEA 28 of the fuel cell 12 includes a membrane electrode assembly 28a (hereinafter referred to as the "MEA 28a"), and a resin frame member 46 joined to, and provided around an outer peripheral portion of the MEA 28a. The MEA 28a includes an electrolyte membrane 40, an anode 42 provided on one surface of the electrolyte membrane 40, and a cathode 44 provided on the other surface of the electrolyte membrane 40. It should be noted that the electrolyte membrane 40 may protrude outward, without using the resin frame member 46 in the MEA 28a. A frame shaped film member may be used as the resin frame member 46.

The electrolyte membrane 40 is a solid polymer electrolyte membrane (cation ion exchange membrane). For example, the solid polymer electrolyte membrane is a thin membrane of perfluorosulfonic acid containing water. A fluorine based electrolyte may be used as the electrolyte membrane 40. Alternatively, an HC (hydrocarbon) based electrolyte may be used as the electrolyte membrane 40. The resin frame member 46 is provided around the MEA 28a to reduce the cost of the electrolyte membrane 40, and suitably adjust the contact pressure between the MEA 28a and the first and second separators 30, 32.

At one end of the resin frame member 46 in the direction indicated by the arrow B1, the oxygen-containing gas supply passage 34a, the coolant supply passage 36a, and the fuel gas discharge passage 38b are provided. At one end of the resin frame member 46 in the direction indicated by the arrow B2, the fuel gas supply passage 38a, the coolant discharge passage 36b, and the oxygen-containing gas discharge passage 34b are provided.

For example, the resin frame member 46 is made of PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin.

The first and second separators 30, 32 are in the form of plates. For example, the first separator 30 and the second separator 32 are formed by press forming of steel plates, stainless steel plates, aluminum plates, plated steel plates, or metal plates having anti-corrosive metal surfaces by surface treatment. That is, the first and second separators 30, 32 are metal plates of the present invention. Predetermined portions on the outer peripheral side of the first and second metal separators 30, 32 are joined together to form a joint separator 33, by a production method described later.

The first separator 30 has an oxygen-containing gas flow field 48 as a passage of the oxygen-containing gas on a surface 30a facing the cathode 44 of the resin frame equipped MEA 28 (in FIG. 2, for convenience, the direction of the flow of the oxygen-containing gas is shown on the cathode 44 of the MEA 28a). The oxygen-containing gas flow field 48 includes straight flow grooves 48b (or wavy flow grooves) formed between a plurality of ridges 48a extending along the first separator 30 in the direction indicated by the arrow B.

The oxygen-containing gas flow field 48 is connected to (in fluid communication with) the oxygen-containing gas supply passage 34a and the oxygen-containing gas discharge passage 34b. Further, an inlet buffer 50a is provided between the oxygen-containing gas supply passage 34a and the oxygen-containing gas flow field 48 on the surface 30a on the first separator 30. The inlet buffer 50a includes a plurality of bosses 49. An outlet buffer 50b is provided between the oxygen-containing gas discharge passage 34b and the oxygen-containing gas flow field 48 on the surface 30a of the first separator 30. The outlet buffer 50b includes a plurality of bosses 49.

A first bead 51 is formed on the surface 30a of the first separator 30. The first bead 51 protrudes integrally from the surface 30a toward the resin frame equipped MEA 28, and contacts the resin frame member 46 to form a seal. The first bead 51 includes an inner bead 51a formed around the oxygen-containing gas flow field 48, the inlet buffer 50a, and the outlet buffer 50b, and an outer bead 51b extending outside the inner bead 51a, along the outer periphery of the first separator 30. The inner bead 51a and the outer bead 51b prevent flow of the oxygen-containing gas to the outside of the oxygen-containing gas flow field 48. It should be noted that extensions 26, 27 of the first separator 30 protrude outward of the first separator 30, from the outside of the outer bead 51b.

Further, the first bead 51 includes a plurality of passage beads 52 around the fuel gas supply passage 38a, the fuel gas discharge passage 38b, the coolant supply passage 36a, and the coolant discharge passage 36b. The passage beads 52 prevent entry of the fuel gas and the coolant into the oxygen-containing gas flow field 48.

That is, in respect of the overall shape, the first separator 30 includes a first plate 54 having a flat shape in the outer periphery of the first separator 30, and first protrusions 56 protruding from the first plate 54 toward the cathode 44 (see also FIG. 4). The first protrusions 56 include a plurality ridges 48a, bosses 49, the first bead 51, etc. The first protrusions 56 have a trapezoidal shape in a cross sectional view in the thickness direction of the first separator 30.

Figure 3:
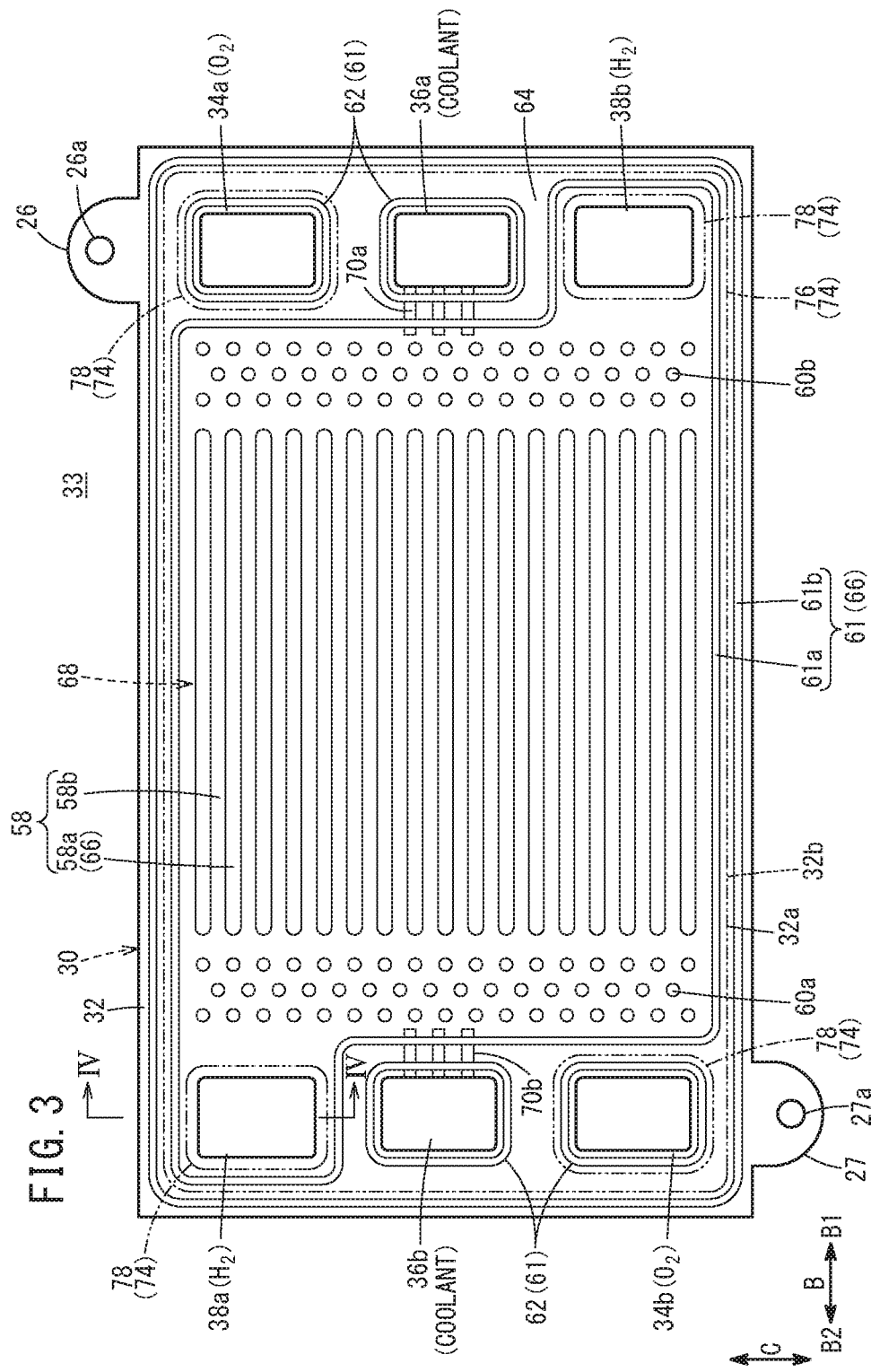
FIG. 3 is a plan view showing the joint separator as viewed from a second separator.

As shown in FIGS. 2 and 3, the second separator 32 includes a fuel gas flow field 58 as a passage of a fuel gas on its surface 32a facing the anode 42 of the resin frame equipped MEA 28. The fuel gas flow field 58 includes straight flow grooves 58b (or wavy flow grooves) formed between a plurality of ridges 58a extending along the second separator 32 in the direction indicated by the arrow B.

The fuel gas flow field 58 is connected to (in fluid communication with) the fuel gas supply passage 38a and the fuel gas discharge passage 38b. An inlet buffer 60a is provided between the fuel gas supply passage 38a and the fuel gas flow field 58, on the surface 32a of the second separator 32. The inlet buffer 60a includes a plurality of bosses 59. Further, an outlet buffer 60b is provided between the fuel gas discharge passage 38b and the fuel gas flow field 58, on the surface 32a of the second separator 32. The outlet buffer 60b includes a plurality of bosses 59.

A second bead 61 is formed by press forming, on the surface 32a of the second separator 32. The second bead 61 protrudes integrally from the surface 32a of the second separator 32 toward the resin frame equipped MEA 28, and contacts the resin frame member 46 to form a seal. The second bead 61 includes an inner bead 61a formed around the fuel gas flow field 58, the inlet buffer 60a, and the outlet buffer 60b, and an outer bead 61b extending outside the inner bead 61a, along the outer periphery of the second separator 32. The inner bead 61a and the outer bead 61b prevent flow of the fuel gas to the outside of the fuel gas flow field 58. It should be noted that extensions 26, 27 of the second separator 32 protrude outward of the second separator 32, from the outside of the outer bead 61b.

Further, the second bead 61 includes a plurality of passage beads 62 around the oxygen-containing gas supply passage 34a, the oxygen-containing gas discharge passage 34b, the coolant supply passage 36a, and the coolant discharge passage 36b. The passage beads 62 prevent entry of the oxygen-containing gas and the coolant into the fuel gas flow field 58.

That is, in respect of the overall shape, the second separator 32 includes a second plate 64 having a flat shape in the outer periphery of the second separator 32, and second protrusions 66 protruding from the second plate 64 toward the anode 42 (see also FIG. 4). The second protrusions 66 include the plurality of ridges 58a, the bosses 59, the second bead 61, etc. The second protrusions 66 have a trapezoidal shape in a cross sectional view in the thickness direction of the second separator 32.

A coolant flow field 68 is formed between a surface 30b of the first separator 30 and a surface 32b of the second separator 32 that are joined together. The coolant flow field 68 is connected to (in fluid communication with) the coolant supply passage 36a and the coolant discharge passage 36b. When the first separator 30 and the second separator 32 are stacked together, the coolant flow field 68 is formed between the back surface of the oxygen-containing gas flow field 48 (the surface opposite to the surface where the oxygen-containing gas flow field 48 is formed) of the first separator 30 and the back surface of the fuel gas flow field 58 (the surface opposite to the surface where the fuel gas flow field 58 is formed) of the second separator 32.

A bridge section 70a is formed between the coolant supply passage 36a and the coolant flow field 68 of the first and second separators 30, 32, for allowing the coolant to flow from the coolant supply passage 36a to the coolant flow field 68. A bridge section 70b is formed between the coolant discharge passage 36b and the coolant flow field 68 of the first and second separators 30, 32, for allowing the coolant to flow from the coolant flow field 68 into the coolant discharge passage 36b.

The joint separator 33 is formed by stacking the above first separator 30 and the second separator 32 together, and welding the first and second separators 32 by laser welding. Therefore, as shown in FIG. 3, the joint separator 33 includes portions where the first separator 30 and the second separator 32 are joined together (hereinafter referred to as the welding zone(s) 74). Specifically, the welding zones 74 include a line of outer welding zone 76 extending along the outer periphery of the joint separator 33, and reactant gas passage welding zones 78 around the plurality of reactant gas passages (the oxygen-containing gas supply passage 34a, the oxygen-containing gas discharge passage 34b, the fuel gas supply passage 38a, and the fuel gas discharge passage 38b) inside the outer welding zone 76. It should be noted that the welding zones 74 may be formed by welding portions outside the outer bead 61b by laser welding.

The outer welding zone 76 is positioned inside the outer beads 51b, 61b, and slightly smaller than the outer beads 51b, 61b. The facing surfaces (the surface 30b and the surface 32b) on the outer peripheral side of the first separator 30 and the second separator 32 are firmly joined together by the outer welding zone 76, and leakage of the coolant flowing between the first separator 30 and the second separator 32 is prevented.

The plurality of reactant gas passage welding zones 78 firmly join the facing surfaces (the surfaces 30b, 32b) of the first separator 30 and the second separator 32 around the reactant gas passages. The reactant gas passage welding zones 78 prevent the reactant gases from flowing from the reactant passages to a position (coolant flow field 68) between the first separator 30 and the second separator 32.

It should be noted that the fuel cell 12 may includes a drain passage for discharging the water produced in reaction, etc. accumulated in the channel of the oxygen-containing gas, and a drain passage for allowing the water produced in reaction, etc. accumulated in the channel of the fuel gas to flow, and an air release passage, etc. for discharging the air from the coolant flow field 68, and the welding zones 74 may be formed around these fluid passages. That is, the welding zones 74 may be provided around the fluid passages of the first and second separators 30, 32.

At the time of producing (welding) the above joint separator 33, a production apparatus 80 shown in FIG. 4 is used. The production apparatus 80 includes a separator fixing unit 82 for fixing the first and second separators 30, 32 in the state where the first and second separators 30, 32 are stacked together, laser light emitting units 84 for emitting a laser light to welding target positions of the fixed first and second separators 30, 32, and a control unit 85 for controlling operation of the separator fixing unit 82 and the laser light emitting units 84. In FIG. 4, the first and second separators 30, 32 are fixed to the separator fixing unit 82, and the first and second separators 30, 32 are welded together by laser welding in the state where the second separator 32 is stacked on the first separator 30. Alternatively, the first and second separators 30, 32 may be welded together by laser welding in the state where the first separator 30 is stacked on the second separator 32.

Further, the separator fixing unit 82 includes a base 86 and a holder 90 which work in cooperation with the base 86 to hold the first and second separators 30, 32. The base 86 and the holder 90 are made of material having high heat conductivity, and function to absorb the heat influence at the time of welding. Materials of the base 86 and the holder 90 are not limited specifically. For example, iron, copper, copper alloy, etc. are preferably used.

The base 86 is in the form of a plate. An upper surface of the base 86 is a placement surface 86a, and the first separator 30 is placed on the placement surface 86a. The placement surface 86a is formed to have a shape corresponding to the uneven surface the first separator 30. Specifically, the placement surface 86a includes a base side flat holder surface 88 (flat surface) and base side recesses 89 having a predetermined depth from the base side flat holding surface 88.

In the state where the first separator 30 is placed, the first plate 54 in the uneven surface of the first separator 30 is placed on the base side flat holding surface 88. In the state where the first separator 30 is placed, the first protrusions 56 (the ridges 48a of the oxygen-containing gas flow field 48, the bosses 49, and the first bead 51) protruding from the first plate 54 are inserted into the base side recesses 89. In this insertion state, peaks of the trapezoidal first protrusions 56 of the first separator 30 and the bottom surfaces of the base side recesses 89 contact, and fit each other. It should be noted that gaps may be formed between the trapezoidal peaks of the first protrusions 56 and the bottom surfaces of the base side recesses 89.

Preferably, the base 86 (separator fixing unit 82) may have a positioning unit (not shown) for receiving the extensions 26, 27 of the first and second separators 30, 32, and the positioning unit may have pins inserted into the through holes 26a, 27a. In the structure, the first and second separators 30, 32 are stacked together in the state where the first and second separators 30, 32 are positioned with respect to each other on the separator fixing unit 82.

On the other hand, the holder 90 is provided above the base 86, and is in the form of a plate which faces the base 86. The holder 90 is connected to a displacement mechanism 92, and movable back and forth relative to the base 86 under control of the control unit 85. The holder 90 moves ahead toward the first and second separators 30, 32 placed on the base 86 to apply a suitable pressing force to the first and second separators 30, 32. In this manner, in the state where the first and second separators 30, 32 are held between the holder 90 and the base 86, the separator fixing unit 82 firmly positions, and fixes the first and second separators 30, 32.

A lower surface of the holder 90 is a holder surface 90a which presses the second separator 32 stacked on the first separator 30. The holder surface 90a has a shape corresponding to the uneven surface of the second separator 32. Specifically, the holder surface 90a includes a holder side flat holding surface 94 (flat surface) and holder side recesses 95 having a predetermined depth from the holder side flat holding surface 94.

In the state where the first and second separators 30, 32 are held, the second plate 64 in the uneven surface of the second separator 32 is placed below the holder side flat holding surface 94. In the state where the first and second separators 30, 32 are held, the second protrusions 66 (the ridges 58a of the fuel gas flow field 58, the bosses 59, and the second bead 61) protruding from the second plate 64 are inserted into the holder side recesses 95. In this insertion state, peaks of the trapezoidal second protrusions 66 of the second separator 32 and the bottom surfaces of the holder side recesses 95 contact, and fit each other. It should be noted that gaps may be formed between the trapezoidal peaks of the second protrusions 66 and the bottom surfaces of the holder side recesses 95.

Further, the holder 90 is divided into a plurality of (four, in FIG. 4) blocks 96 (blocks 96a to 96d) in correspondence with the laser welding positions. It should be noted that a single block may be used instead of a plurality of certain blocks 96. The plurality of blocks 96 are displaced at the same timing, or at different timings under operation of the displacement mechanism 92. A gap 98 is formed between the adjacent blocks 96, and these blocks 96 are spaced from each other by a predetermined distance.

The gap 98 is continuous along the formation line (see FIG. 3) of the welding zone 74 of the first and second separators 30, 32. A predetermined range of the surface 32a of the second separator 32 including the welding target positions is exposed through the gap 98. Side walls of the blocks 96 forming the gap 98 have a tapered shape where the width is narrowed gradually toward the base 86, in a cross sectional view taken in the thickness direction of the holder 90.

A plurality of (five) laser light emitting units 84 are provided in correspondence with the plurality of welding zones 74 (the outer welding zone 76 and the four reactant gas passage welding zones 78) formed in the joint separator 33. Each of the laser light emitting units 84 emits a laser light Li at a predetermined frequency and at high output to the welding target positions of the first and second separators 30, 32. The first and second separators 30, 32 are welded together by heating and melting (merging) the first and second separators 30, 32 using the laser light Li. The structure of the laser light emitting units 84 is not limited specially. The laser light emitting units 84 may adopt known structure. The production apparatus 80 may weld a plurality of welding zones 74 successively using one laser light emitting unit 84.

Each of the plurality of laser light emitting units 84 is connected to an emitting unit actuator 99, and moves along a circulating line of each of the welding zones 74 while emitting the laser light Li under operation of the emitting unit actuators 99. The emitting unit actuators 99 move the laser light emitting units 84 based on a control instruction of the control unit 85.

Figure 5A:
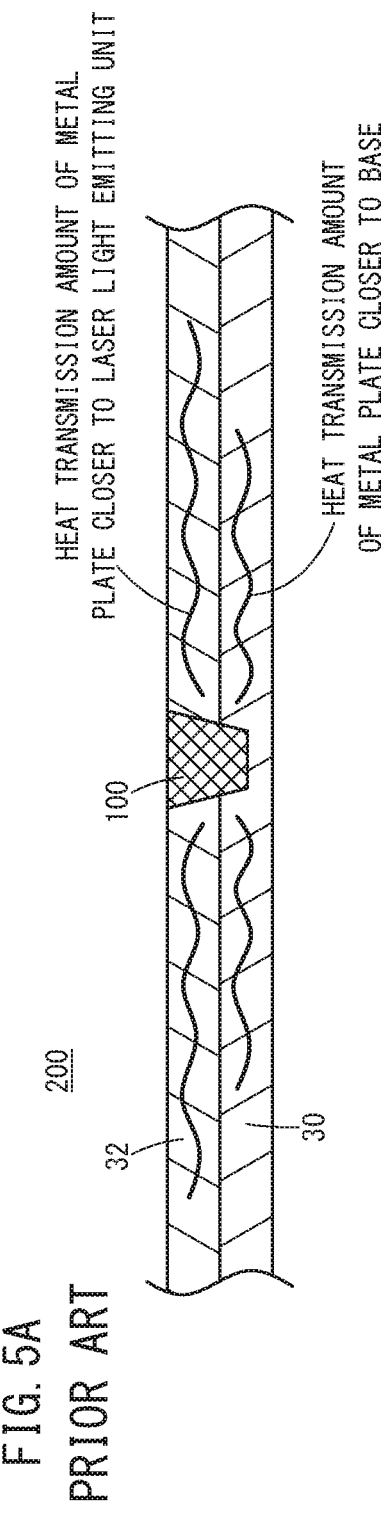
FIG. 5A is a cross view showing heat transmission at the time of laser welding in a conventional method of producing a joint separator.

As shown in FIG. 5A, the positions of the first and second separators 30, 32 to which the laser light Li is radiated by the laser light emitting unit 84 becomes a heat affected zone 100 where the first and second separators 30, 32 are melted together to form the welding zone 74.

In this regard, the heat affected zone 100 is narrowed from the surface 32a of the second separator 32 toward the surface 30a of the first separator 30. That is, in laser welding, the second separator 32 which directly receives the laser light Li of the laser light emitting unit 84 is melt to a greater extent, and the first separator 30 is melt to a lesser extent. Further, the heat transmission amount in the surface direction of the second separator 32 (direction in which the second separator 32 extends) is larger than the heat transmission amount in the surface direction of the first separator 30. It should be noted that the laser light emitting unit 84 adjusts the output and the movement speed of the laser light Li such that the heat affected zone 100 does not reach the surface 30a of the first separator 30. Thus, the heat affected zone 100 does not penetrate through the first separator 30.

Figure 5B:
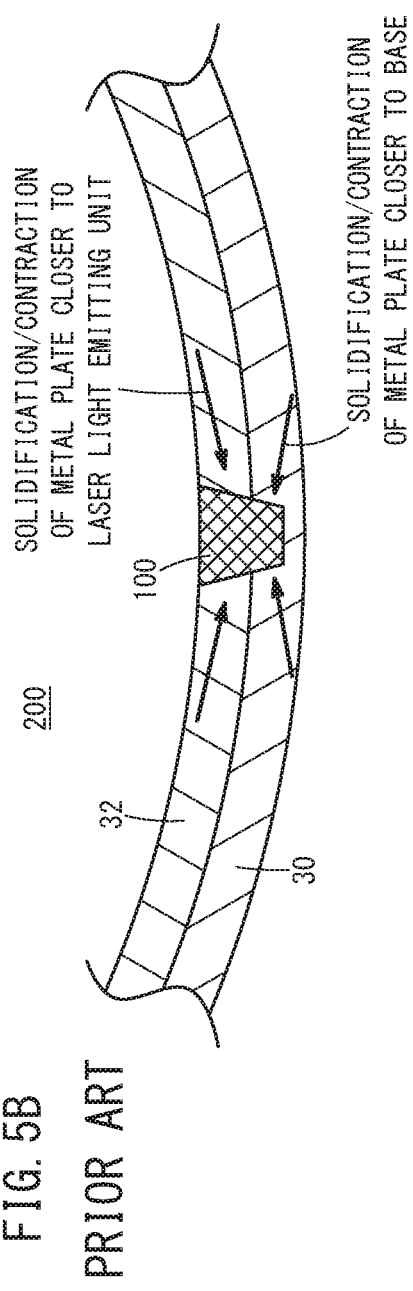
FIG. 5B is a cross sectional view showing solidification/contraction in the conventional method of producing the joint separator.

Therefore, as shown in FIG. 5B, in a joint separator 200 produced by a conventional production method, when the heat affected zone 100 is solidified and contracted after laser welding, a difference occurs between the deformation amount of the first separator 30 and the deformation amount of the second separator 32. That is, heat distortion which causes large heat contraction of the second separator 32 in comparison with the first separator 30 occurs. As a result, the joint separator 200 is curved (warped) to form a recess in the welding zone 74 facing the first separator 30.

Figure 6:
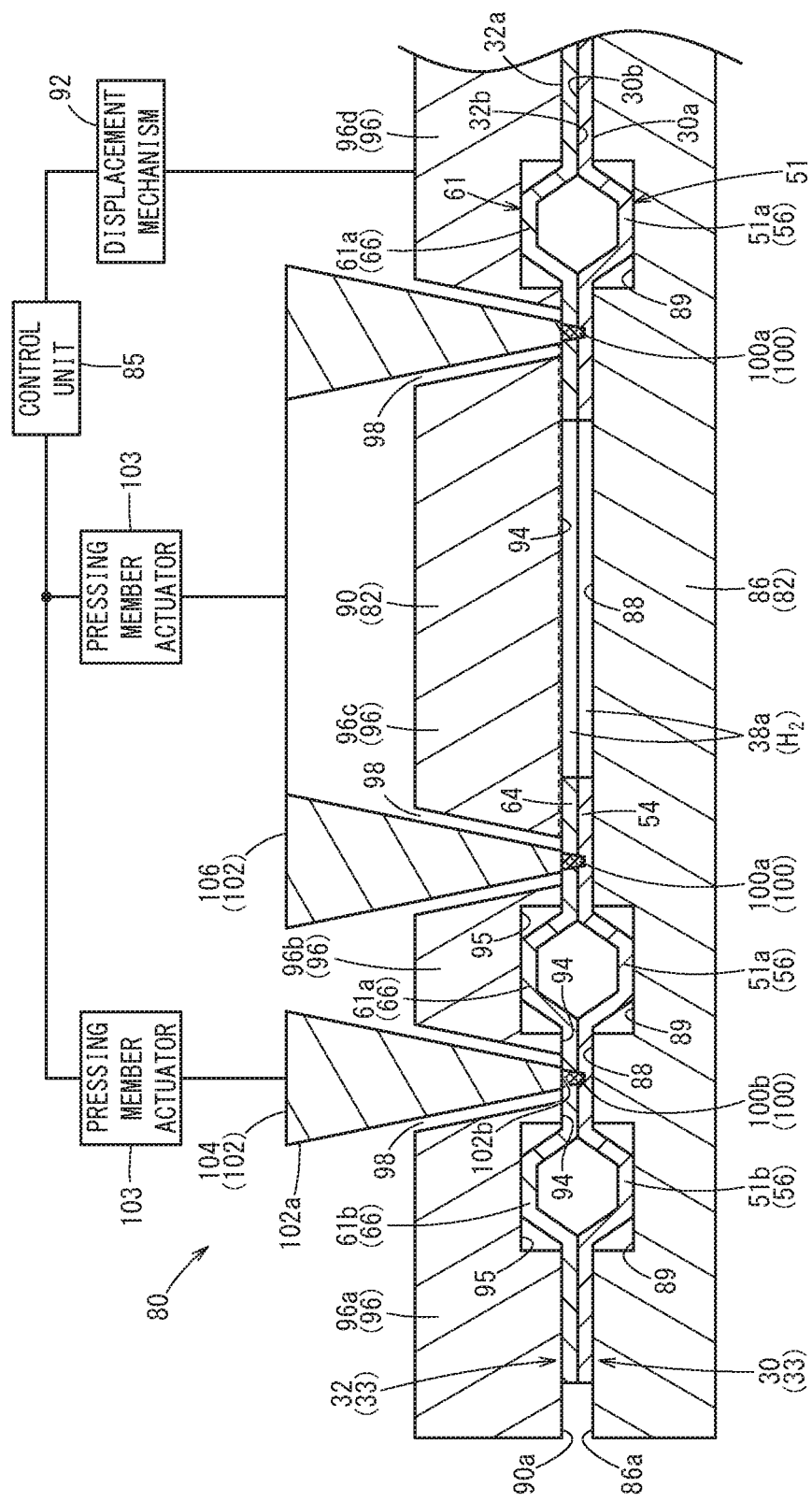
FIG. 6 is a view showing cross section of the joint separator and a pressing member of the production apparatus in combination.

In order to suppress generation of the above curve, the production apparatus 80 according to the embodiment of the present invention is configured to perform additional pressing after laser welding. For this reason, as shown in FIG. 6, the production apparatus 80 includes a plurality of pressing members 102 aimed to distribute the residual stress remaining in the heat affected zone 100 by pressing the heat affected zone 100. The plurality of pressing members 102 move in the same direction as the beam emitting direction of the laser light Li of the laser light emitting units 84, and presses the first and second separators 30, 32 through the gap 98 of the holder 90. When the pressing members 102 press the first and second separators 30, 32, the surface (base side flat holding surface 88) facing the pressing members 102 contacts, and supports the first and second separators 30, 32. The plurality of pressing members 102 are connected to pressure member actuators 103, respectively. Operation of the pressing member actuators 103 is controlled by the control unit 85.

Under operation of the emitting unit actuators 99 and the pressing member actuators 103, the laser light emitting units 84 are moved after completion of laser welding by the laser light emitting units 84, and the pressing members 102 are placed to face the heat affected zones 100. Further, under control of the control unit 85, the pressing members 102 pass through the gaps 98, and move toward the heat affected zones 100. The pressing members 102 press the heat affected zones 100 and their surrounding areas from the surface 32a of the second separator 32 to distribute the residual stress of the pressed positions. The time period for which the pressing members 102 contact, and press the heat affected zones 100 is not limited specially. Preferably, the pressing members 102 punch the heat affected zones 100 instantaneously (for a short period of time). Alternatively, the pressing members 102 may increase their pressing forces gradually over some time.

Specifically, the pressing members 102 include an outer pressing member 104 provided at a position corresponding to the welding zone 74 (see FIG. 3) of the first and second separators 30, 32 to face the outer welding zone 76, and four reactant gas passage pressing members 106 facing the four reactant gas passage welding zones 78, respectively. In a plan view, the outer pressing member 104 and the four reactant gas passage pressing members 106 have round (cylindrical) corners formed along welding lines of the welding zones 74. Further, in a cross sectional view taken in the axial direction of the pressing member 102, a wall 102a of the pressing member 102 has a tapered shape narrowed gradually from the upper side (part connected to the pressing member actuator 103) toward the lower side (front end surface 102b which contacts the joint separator 33).

Figure 7A:
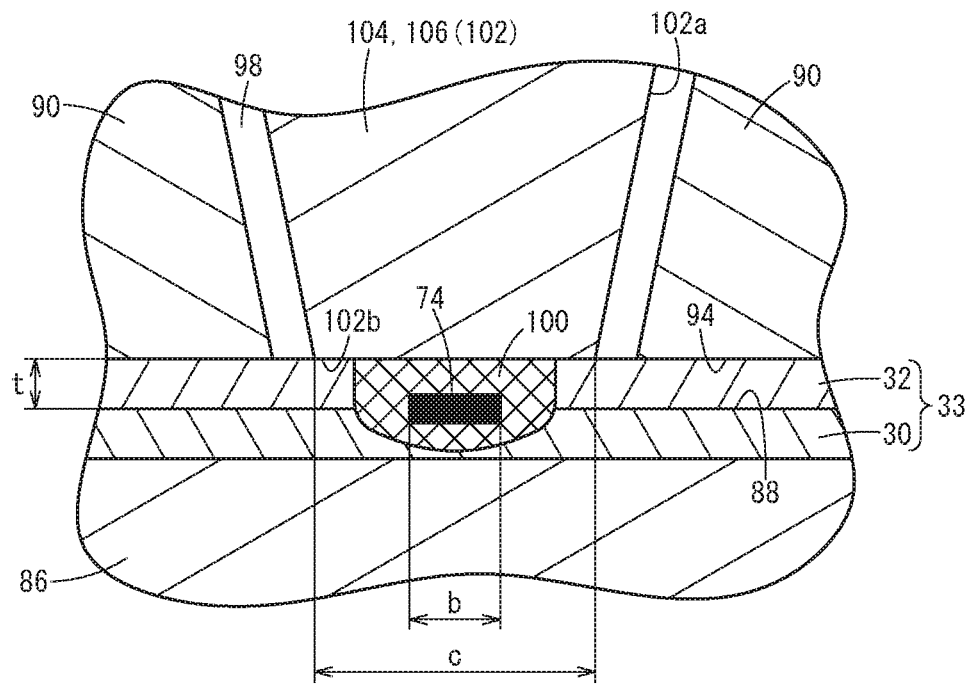
FIG. 7A is a cross sectional view in which a portion where the pressing member contacts the joint separator is enlarged.

Further, as shown in FIG. 7A, the front end surface 102b of the pressing member 102 has a flat shape in parallel to the surface 32a of the joint separator 33 (second separator 32). Preferably, the width "c" of the front end surface 102b is determined to be larger than the width of the heat affected zone 100 at the time of laser welding.

Specifically, the output, the movement speed, and the radiation range of the laser light Li are determined in correspondence with the thicknesses of the first and second separators 30, 32. Based on the output, the movement speed, and the radiation range of the laser light Li, the width of the welding zone 74 is determined. The welding zone 74 is formed at the center of the heat affected zone 100 as a part where the melted portions of the first and second separators 30, 32 are mixed together, and solidified to join the first and second separators 30, 32 directly. The welding zone 74 is in the form of a welding bead protruding from the radiation side (second separator 32) of the laser light Li toward the first separator 30.

That is, when the laser light Li is emitted, the heat affected zone 100 is produced to surround the welding zone 74. Therefore, it is possible to determine the width of the front end surface 102b in correspondence with the width of the welding zone 74. Specifically, the width "c" of the front end surface 102b is determined by the following equations (1) and (2).

$$b = t \times (1.05 \text{ to } 1.1) \quad (1)$$

$$c \approx b \times 1.3 \quad (2)$$

where t is the thickness of the second separator 32, and "b" is the width of the welding zone 74. By the width "c" of the front end surface 102b determined by the equations (1), (2), it is possible to suitably press the heat affected zone 100.

Further, the pressing force applied to the first and second separators 30, 32 by the pressing member 102 is determined to have a value which achieves distribution of the residual stress of the first and second metal separators 30, 32, and enables the first and second separators 30, 32 to be deformed plastically. That is, the pressing force is determined to be not less than the yield stress (or 0.2% yield strength) of the material of the first and second separators 30, 32. For example, in the case where the first and second separators 30, 32 are made of SUS316L, the heat affected zone 100 should be pressed by the pressure (surface pressure) of not less than 175 MPa.

Figure 7B:
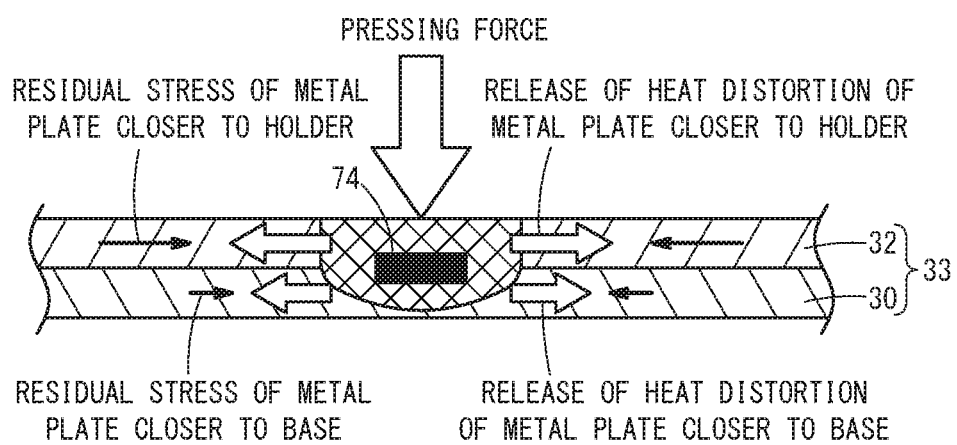
FIG. 7B is a cross sectional view showing operation when the pressing member applies a pressing force in the method of producing the joint separator according to the present invention.

As shown in FIG. 7B, when the pressing member 102 applies the pressing force of the above condition to the first and second separators 30, 32, the residual stress of the heat affected zone 100 is distributed effectively. In this manner, it is possible to obtain the first and second separators 30, 32 having reduced warpage.

The production apparatus 80 of the joint separator 33 according to the embodiment of the present invention basically has the above structure. Hereinafter, a method of producing the joint separator 33 will be described. The first separator 30 and the second separator 32 used for producing the joint separator 33 are made of the same material. For example, the first and second separators 30, 32 are steel plates, stainless steel plates, aluminum plates, plated steel plates, or metal plates having anti-corrosive metal surfaces by surface treatment. Since the first and second separators 30, 32 are made of the same material, it is possible to weld the first and second separators 30, 32 easily. Further, the first separator 30 and the second separator 32 have the same plate thickness.

As shown in FIG. 8, in the method of producing the joint separator 33, using the production apparatus 80, a stacking step, a fixing step, a welding step, an additional pressing step, and a collection step are performed successively.

In the stacking step, the first separator 30 is transported by a transportation apparatus (not shown) (or manually by a user), and the first separator 30 is placed on the placement surface 86a of the base 86. After the first separator 30 is placed on the placement surface 86a of the base 86, the second separator 32 is transported by a transportation apparatus (not shown) (or manually by a user), and the second separator 32 is placed on the first separator 30 which is placed on the placement surface 86a of the base 86.

At this time, the extensions 26, 27 of the first and second separators 30, 32 are placed on a positioning part of the separator fixing unit 82 (base 86). In this manner, the first and second separators 30, 32 are positioned with respect to each other, and in this state, the first and second separators 30, 32 are stacked together. That is, the first and second separators 30, 32 are stacked together in the state where the peaks of the straight flow grooves 48b, 58b protruding toward the surfaces 30b, 32b of the first and second separators 30, 32 contact, and support each other, and the coolant flow field 68 is formed between the first and second separators 30, 32.

In the fixing step, after the first and second separators 30, 32 are stacked together in the stacking step, as shown in FIG. 4, the first and second separators 30, 32 are held by the base 86 and the holder 90, and thus, the first and second separators 30, 32 are fixed. The control unit 85 controls operation of the displacement mechanism 92 (e.g., a motor or a cylinder driven by fluid) to move the holder 90 ahead relative to the base 86, and the holder 90 and the base 86 work cooperatively to apply the pressing force to the first and second separators 30, 32 to disable movement of the first and second separators 30, 32 in the surface direction of the first and second separators 30, 32.

After the first and second separators 30, 32 are held by the base 86 and the holder 90 in the fixing step, the laser light Li is emitted from the laser light emitting units 84 to the first and second separators 30, 32 through the gaps 98 to weld the first and second separators 30, 32 in the welding step. In this regard, preferably, in the welding step, the welding target positions on the inner side of the surfaces of the first and second separators 30, 32 are welded first, and thereafter, the welding target positions on the outer side of the surface of the first and second separators 30, 32 are welded.

That is, as shown in FIG. 8, in the welding step, an inner welding step of welding the welding target positions of the reactant gas passage welding zones 78 by laser welding is performed first. Further, in the welding step, after performing the inner welding step, the outer welding step of welding the welding target positions of the outer welding zone 76 by laser welding is performed. It should be noted that the welding target positions of the outer welding zone 76 and the reactant gas passage welding zones 78 may be welded at the same time.

In the inner welding step, the control unit 85 controls operation of the emitting unit actuator 99 to move the four laser light emitting units 84 facing the welding target positions of the reactant gas passage welding zones 78, and emits the laser light Li from each of the laser light emitting units 84. The laser light Li passes through the gap 98 of the holder 90, and reaches the first and second separators 30, 32. As a result, the first and second separators 30, 32 are melt to produce heat affected zones 100a around the reactant gas passages (the oxygen-containing gas supply passage 34a, the oxygen-containing gas discharge passage 34b, the fuel gas supply passage 38a, and the fuel gas discharge passage 38b), and the first and second separators 30, 32 are joined together at the melt positions.

Further, in the outer welding step, the control unit 85 controls operation of the emitting unit actuator 99 to move the laser light emitting unit 84 facing the welding target position of the outer peripheral welding zone 76 and emits the laser light Li from the laser light emitting units 84. As a result, the first and second separators 30, 32 are melt to produce a heat affected zone 100b in the other periphery of the first and second separators 30, 32 (outer beads 51b, 61b), and the first and second separators 30, 32 are joined together at the melt positions.

In the additional pressing step, after the welding step, the heat affected zones 100 of the first and second separators 30, 32 are pressed for a short period of time by the pressing members 102 to distribute the residual stress of the heat affected zones 100 and their surrounding areas. Also in the additional pressing step, the fixed state where the first and second separators 30, 32 are fixed in the fixing step, is maintained. Therefore, in the state where the base side flat holding surface 88 contacts, and supports the back surface of the pressed positions of the first and second separators 30, 32, the pressing members 102 press the first and second separators 30, 32. Preferably, also in the additional pressing step, the heat affected zones 100a inside the first and second separators 30, 32 are pressed first, and thereafter, the outer heat affected zone 100b is pressed.

That is, as shown in FIG. 8, in the additional pressing step, an inner additional pressing step of pressing the heat affected zones 100a where the reactant gas passage welding zones 78 are expected to be formed afterward, is performed first. Further, after performing the inner additional pressing step, an outer additional pressing step of pressing the heat affected zone 100b where the outer peripheral welding zone 76 is expected to be formed afterward, is performed.

In the inner additional pressing step, the control unit 85 moves the laser light emitting units 84 by the emitting unit actuators 99, and the four reactant gas passage pressing members 106 are placed by the pressing member actuators 103 to face the four heat affected zones 100a, respectively. Thereafter, the control unit 85 moves the four reactant gas passage pressing members 106 into the gaps 98, respectively, and presses (punches) the heat affected zones 100a and their surrounding areas by the front end surfaces 102b of the reactant gas passage pressing members 106. At this time, the front end surface 102b applies the predetermined pressing force (of not less than the yield stress or 0.2% yield strength of the material of the metal plate) to the second separator 30.

As shown in FIG. 7A, in the first and second separators 30, 32, after the metal plates are melt in the welding step, the welding zone 74 (welding bead) is formed, and the heat affected zone 100 which is affected by solidification/contraction is produced around the welding zone 74. In the inner additional pressing step, for the heat distortion produced as a result of this solidification/contraction, as shown in FIG. 7B, the above pressing force is applied from the pressing members 102 to the heat affected zones 100a. As a result, the residual stress produced by heat distortion of the heat affected zones 100a is distributed, and plastic deformation is induced. As a result, in the reactant gas passage welding zones 78 and their surrounding areas, warpage of the metal plate itself is reduced, and the metal plate becomes flat.

Referring back again to FIG. 8, in the outer additional pressing step after the inner additional pressing step, the control unit 85 places the outer pressing member 104 to face the heat affected zone 100b by the pressing member actuator 103. After the outer pressing member 104 is placed to face the heat affected zone 100b, the control unit 85 moves the outer pressing member 104 ahead into the gap 98, and presses the heat affected zone 100b and its surrounding area at the predetermined pressing force, by the front end surface 102b. In this manner, the residual stress produced by heat distortion of the heat affected zone 100b is distributed, and plastic deformation is induced. As a result, also in the outer peripheral welding zone 76 and its surrounding area, warpage of the metal plate itself is reduced, and the metal plate becomes flat.

Further, in a collecting step, the pressing members 102 are retracted, and the holder 90 is moved upward relative to the base 86 (moved away from the base 86) to release fixing of the first and second separators 30, 32 to make the joint separator 33 collectable. Thereafter, the joint separator 33 is collected from the base 86 by the transportation apparatus (or manually by the user), and the production apparatus 80 finishes the production method of one joint separator 33. The production apparatus 80 repeats the above steps to produce a plurality of the joint separators 33.

Technical concepts that can be understood from the embodiment of the production method and the production apparatus 80 for the joint separator 33 will be described below.

In the production method and the production apparatus 80 for the joint separator 33, an additional pressing step is performed after the welding step using the laser light Li, in the state where two metal plates (the first and second separators 30, 32) are held between the base 86 and the holder 90, to press the welded areas (heat affected zones 100), by the pressing members 102. In this manner, it is possible to achieve distribution of the residual stress remaining in the heat affected zones 100, and correct (straighten) warpage of the metal plates themselves efficiently. That is, it is possible to obtain the metal plates having reduced warpage. In particular, since warpage of the metal plates is corrected in the state where the metal plates are held by the welded jig (separator fixing unit 82), it is not necessary to transfer the metal plates to another correction jig, and good efficiency and good correction accuracy are achieved. In this manner, in the joint separator 33, it becomes possible to stack the fuel cells 12 together accurately, and suppress leakage of the reactant gases and the coolant. Further, it is possible to improve the uniformity of the contact surface pressure between the separator and the membrane electrode assembly 28a.

Further, the plurality of metal plates comprise the first metal separator 30 and a second metal separator 32. In this manner, in the production method and the production apparatus 80 for the joint separator 33, at the time of joining the two separators (first and second metal separators 30, 32) together, it is possible to suppress occurrence of warpage more effectively.

Further, in the additional pressing step, the pressing members 102 apply pressing force of not less than the yield stress or 0.2% yield strength of material of the metal plates (first and second separators 30, 32). By the pressing force determined in this manner, the pressing member 102 can ensure that the first and second separators 30, 32 are joined together (sealed) in the welding zones 74, and reliably deform the joint separator 33 plastically.

Further, the fluid passages (the oxygen-containing gas supply passage 34a, the oxygen-containing gas discharge passage 34b, the fuel gas supply passage 38a, the fuel gas discharge passage 38b) are formed on the inner side of the joint separator 33, and in the welding step, after the inner welding step of welding areas around the fluid passages is performed, the outer welding step of welding an outer peripheral side of the joint separator 33 is performed. As described above, in the welding step, the inner welding step and the outer welding step are performed successively. In this manner, in the joint separator 33, the welding zones 74 around the fluid passages are formed accurately, and it becomes possible to suitably prevent leakage of fluid from/to the fluid passages.

Further, the fluid passages (the oxygen-containing gas supply passage 34a, the oxygen-containing gas discharge passage 34b, the fuel gas supply passage 38a, and the fuel gas discharge passage 38b) are formed on the inner side of the joint separator 33, and in the additional pressing step, after the inner additional pressing step of pressing areas (heat affected zones 100b) around the fluid passages is performed, the outer additional pressing step of pressing the welded area (heat affected zone 100b) on an outer peripheral side of the joint separator 33 is performed. As described above, the inner additional pressing step and the outer additional pressing step are performed successively in the additional pressing step. In this manner, in the joint separator 33, the heat affected zones 100 around the fluid passages can be deformed plastically beforehand. That is, in the production method, by applying a pressing force to release distortion produced in welding the first and second separators 30, 32 from the inside to the outside, it becomes possible to form the welding zones 74 more accurately.

Further, the base 86 includes a flat portion corresponding to the gap 98. In the structure, the base 86 suitably receives the load of the pressing member 102 in the additional pressing step, and at the time of pressing the first and second separators 30, 32, it is possible to prevent undesirable deformation of the first and second separators 30, 32. Further, the base 86 can smoothly transmit the heat produced at the time of welding, and facilitate solidification in the welding zones 74.

It should be noted that the present invention is not limited to the above embodiment. Various modifications may be made in line with the gist of the invention. For example, in the production method and the production apparatus 80 for the joint separator 33, for example, three or more metal plates (separators) may be stacked together, and the welding step may be performed for at least two metal plates, and thereafter, the additional pressing step may be performed for the heat affected zone 100 produced by laser welding. Alternatively, the production method and the production apparatus of the present invention may be applicable to a joint separator formed by joining three metal plates (separators) together.

What is claimed is:

1. A method of producing a joint separator formed by joining a plurality of metal plates together by laser welding, the method comprising the steps of:
   fixing at least two of the metal plates placed on a base in a state where the two metal plates are stacked together, by holding the two metal plates between the base and a holder;
   welding the two metal plates together after the fixing step, by radiating a laser light to the metal plates from a laser light emitting unit, through a gap provided in the holder; and
   performing an additional pressing step after the welding step, by moving a pressing member ahead through the gap, in a state where the two metal plates are held between the base and the holder, to press an area welded by the laser light, by the pressing member.

2. The method of producing the joint separator according to claim 1, wherein the plurality of metal plates comprise a first metal separator and a second metal separator.

3. The method of producing the joint separator according to claim 1, wherein a fluid passage is formed on an inner side of the joint separator; and
   in the welding step, after an inner welding step of welding an area around the fluid passage is performed, an outer welding step of welding an outer peripheral side of the joint separator is performed.

4. The method of producing the joint separator according to claim 1, wherein a fluid passage is formed on an inner side of the joint separator; and
   in the additional pressing step, after an inner additional pressing step of pressing a welded area around the fluid passage is performed, an outer additional pressing step of pressing a welded area on an outer peripheral side of the joint separator is performed.

5. The method of producing the joint separator according to claim 1, wherein the base includes a flat portion corresponding to the gap.

6. A production apparatus for forming a joint separator by joining a plurality of metal plates by laser welding, the apparatus comprising:
   a base where at least two of the metal plates are placed in a state where the two metal plates a stacked together;
   a holder configured to hold the two metal plates between the base and the holder, the holder including a gap that is continuous along a formation line in which the two metal plates to be welded in a manner that the formation line is exposed through the gap;
   a laser light emitting unit configured to radiate a laser light to the metal plates, through the gap provided in the holder in a state where the two metal plates are held between the base and the holder, to weld the two metal plates together; and
   a pressing member configured to move ahead through the gap in the holder, in a state where the two metal plates are held between the base and the holder, to press an area welded by the laser light.

* * * * *